(12) United States Patent
Aktas et al.

(10) Patent No.: US 11,904,737 B2
(45) Date of Patent: Feb. 20, 2024

(54) SEATING ASSEMBLY WITH SWIVEL CAPABILITY

(71) Applicant: Ford Global Technologies, LLC, Dearborn, MI (US)

(72) Inventors: Macit Aktas, Windsor (CA); Joseph Michael Kish, Canton, MI (US); Johnathan Andrew Line, Northville, MI (US); Joshua Gauthier, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/865,591

(22) Filed: Jul. 15, 2022

(65) Prior Publication Data

US 2024/0017647 A1   Jan. 18, 2024

(51) Int. Cl.
*B60N 2/14* (2006.01)
*B60N 2/02* (2006.01)

(52) U.S. Cl.
CPC ......... *B60N 2/146* (2013.01); *B60N 2/02246* (2023.08)

(58) Field of Classification Search
CPC ........ B60N 2/146; B60N 2/0232; B60N 2/06; B60N 2/12; B60N 2/143; B60N 2/3038
USPC ...................................... 297/259.1
See application file for complete search history.

(56) References Cited

U.S. PATENT DOCUMENTS

| | | | |
|---|---|---|---|
| 4,846,529 A * | 7/1989 | Tulley | B60N 2/1835 297/DIG. 10 |
| 10,688,889 B2 | 6/2020 | Feng et al. | |
| 10,836,279 B2 | 11/2020 | Aktas et al. | |
| 10,926,669 B2 | 2/2021 | Aktas | |
| 2010/0253123 A1 * | 10/2010 | DeCraene | B60N 2/062 297/344.21 |
| 2020/0101871 A1 * | 4/2020 | Garotte | B60N 2/43 |
| 2020/0406787 A1 | 12/2020 | Line et al. | |
| 2020/0406789 A1 | 12/2020 | Line et al. | |

* cited by examiner

*Primary Examiner* — Mark R Wendell
(74) *Attorney, Agent, or Firm* — Vichit Chea; Price Heneveld LLP

(57) ABSTRACT

A seating assembly is provided with swivel capabilities. The seating assembly includes a coupling member, a seat, a seatback, and a swivel plate. The seat is pivotably coupled to the coupling member. The seatback is also pivotably coupled to the coupling member. Additionally, the swivel plate is coupled to the coupling member.

19 Claims, 13 Drawing Sheets

SEATING ASSEMBLY WITH SWIVEL CAPABILITY

FIELD OF THE DISCLOSURE

The present disclosure generally relates to a seating assembly. More specifically, the present disclosure relates to a seating assembly with swivel capability.

BACKGROUND OF THE DISCLOSURE

Vehicles are often provided with one or more seating assemblies. Seating solutions provided within a passenger compartment of a vehicle can be a deciding factor in consumers purchase decisions.

SUMMARY OF THE DISCLOSURE

According to a first aspect of the present disclosure, a seating assembly includes a coupling member, a seat, a seatback, a swivel plate, and a base plate. The seat is pivotably coupled to the coupling member. The seatback is also pivotably coupled to the coupling member. The swivel plate is coupled to the coupling member. A swivel anchor extends from an underside of the swivel plate. The base plate is positioned below the swivel plate. The swivel plate is capable of rotating about a vertical axis relative to the base plate. A base anchor extends from a top side of the base plate. The swivel anchor and the base anchor are configured to correspond with one another in at least one rotational position of the swivel plate. A base-anchor-facing surface of the swivel anchor is provided with serrations. A swivel-anchor-facing surface of the base anchor is also provided with serrations.

Embodiments of the first aspect of the disclosure can include any one or a combination of the following features:
- the serrations on the swivel anchor and the serrations on the base anchor are each coated with a material;
- the material that is coated onto the serrations of the swivel anchor differs from the material coated onto the serrations of the base anchor;
- the material coated onto the serrations on the swivel anchor provides a flat surface to the base-anchor-facing surface, wherein the material coated onto the serrations on the base anchor provides a flat surface to the swivel-anchor-facing surface;
- the material that is coated onto the serrations on the swivel anchor and the serrations on the base anchor is a low-friction material;
- an engagement member that is coupled to the underside of the swivel plate, wherein the engagement member is sized and positioned to engage with a swivel-plate-facing surface of the base anchor;
- a rotation assembly that is coupled to the swivel plate and the base plate;
- the rotation assembly includes a motor assembly that includes a motor, a first gear, and a drive shaft that is coupled to the motor and the first gear; and a second gear that is coupled to the swivel plate and engages with the first gear, wherein activation of the motor causes movement of the second gear and rotation of the swivel plate about the vertical axis;
- the base plate is contoured to define a forward recess;
- the swivel plate is contoured to define a front recess;
- the swivel anchor is J-shaped and the base anchor is J-shaped;
- the rotation of the swivel plate about the vertical axis relative to the base plate is enabled by a swivel assembly, wherein the swivel assembly is positioned between the swivel plate and the base plate; and
- the swivel assembly includes a fixed plate that is directly coupled to the base plate, wherein the fixed plate defines a first bearing aperture; a first bearing that defines a protrusion that extends downwardly to engage with the first bearing aperture; a rotating plate that is directly coupled to the swivel plate, wherein the rotating plate rotates relative to the fixed plate, wherein the rotating plate engages with an upper surface of the first bearing, and wherein the rotating plate defines a second bearing aperture; a second bearing that defines a protuberance that extends downwardly to engage with the second bearing aperture; and a retaining bracket that is coupled to a circumferential surface of the fixed plate, wherein the retaining bracket engages with a top surface of the second bearing.

According to a second aspect of the present disclosure, a seating assembly includes a coupling member, a seat, a seatback, a swivel plate, a base plate, and a swivel assembly. The seat is pivotably coupled to the coupling member. The seatback is also pivotably coupled to the coupling member. The swivel plate is coupled to the coupling member. The base plate is positioned below the swivel plate. The swivel plate is capable of rotating about a vertical axis relative to the base plate. The rotation of the swivel plate about the vertical axis relative to the base plate is enable by the swivel assembly. The swivel assembly is positioned between the swivel plate and the base plate. The swivel assembly includes a fixed plate, a first bearing, a rotating plate, a second bearing, and a retaining bracket. The fixed plate is directly coupled to the base plate. The fixed plate defines a first bearing aperture. The first bearing defines a protrusion that extends downwardly to engage with the first bearing aperture. The rotating plate is directly coupled to the swivel plate. The rotating plate rotates relative to the fixed plate. The rotating plate engages with an upper surface of the first bearing. The rotating plate defines a second bearing aperture. The second bearing defines a protuberance that extends downwardly to engage with the second bearing aperture. The retaining bracket is coupled to a circumferential surface of the fixed plate. The retaining bracket engages with a top surface of the second bearing.

Embodiments of the second aspect of the present disclosure can include any one or a combination of the following features:
- a swivel anchor that extends from an underside of the swivel plate; and a base anchor that extends from a top side of the base plate, wherein the swivel anchor and the base anchor are configured to correspond with one another in at least one rotational position of the swivel plate;
- a base-anchor-facing surface of the swivel anchor is provided with serrations, wherein a swivel-anchor-facing surface of the base anchor is provided with serrations;
- the serrations on the swivel anchor and the serrations on the base anchor are each coated with a material, wherein the material coated onto the serrations on the swivel anchor provides a flat surface to the base-anchor-facing surface, and wherein the material coated onto the serrations on the base anchor provides a flat surface to the swivel-anchor-facing surface;
- an engagement member that is coupled to the underside of the swivel plate, wherein the engagement member is sized and positioned to engage with a swivel-plate-facing surface of the base anchor;
a rotation assembly that is coupled to the swivel plate and the base plate, wherein the rotation assembly includes: a motor assembly that includes a motor, a first gear, and a drive shaft that is coupled to the motor and the first gear; and a second gear that is coupled to the swivel plate and engages with the first gear, wherein activation of the motor causes movement of the second gear and rotation of the swivel plate about the vertical axis; and
the base plate is contoured to define a forward recess, and wherein the swivel plate is contoured to define a front recess.

These and other aspects, objects, and features of the present disclosure will be understood and appreciated by those skilled in the art upon studying the following specification, claims, and appended drawings.

DETAILED DESCRIPTION OF THE PREFERRED EMBODIMENT'S

Figure 1:
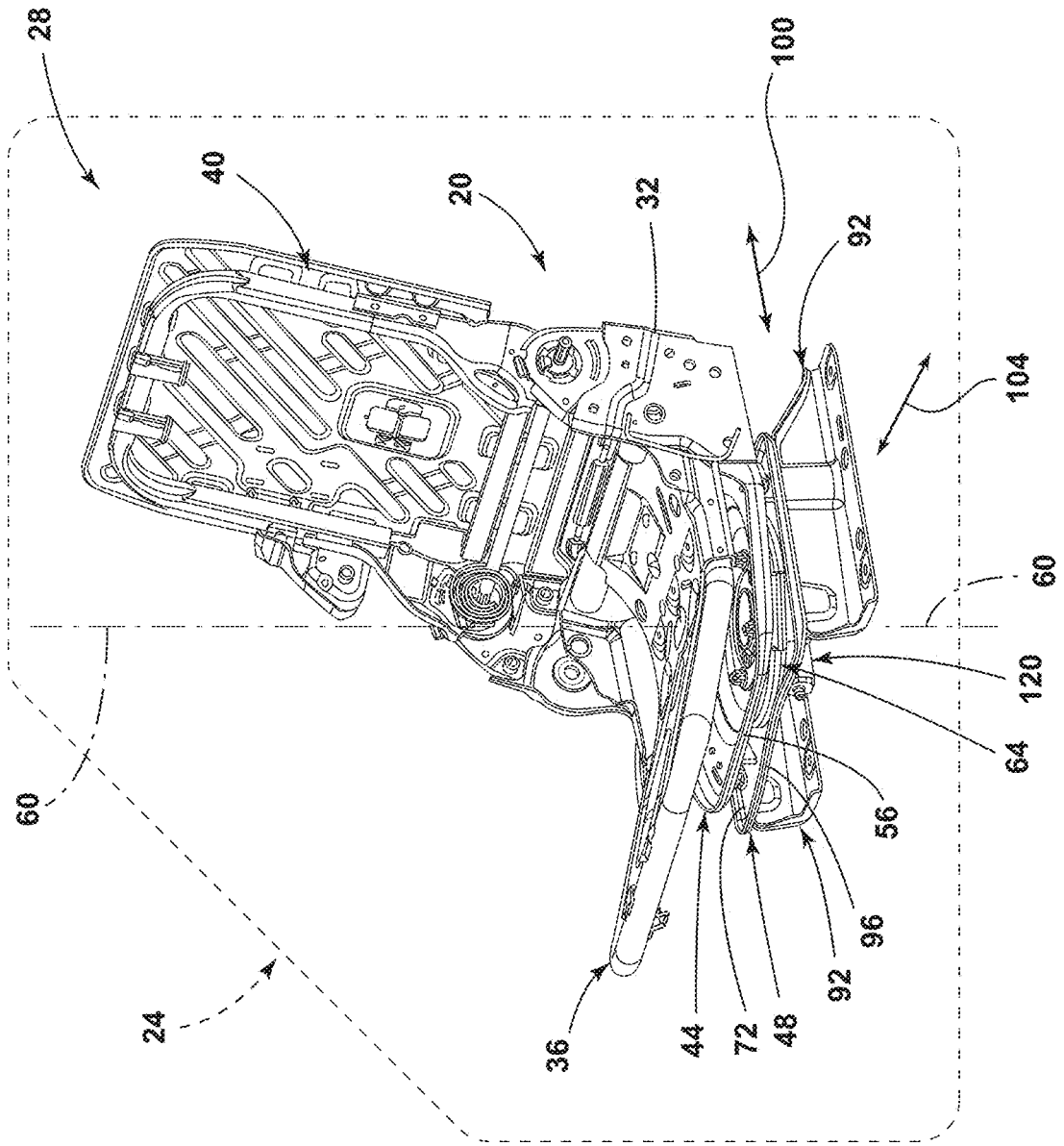
FIG. 1 is a side perspective view of a passenger compartment of a vehicle, illustrating a seating assembly positioned therein, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical dements in the process, method, article, or apparatus that comprises the element.

As used herein, the term "about" means that amounts, sizes, formulations, parameters, and other quantities and characteristics are not and need not the exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about" It will be further understood that the endpoints of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-13, reference numeral 20 generally designates a seating assembly. The seating assembly 20 may be positioned within a vehicle 24. For example, the seating assembly 20 may be positioned within a passenger compartment 28 of the vehicle 24. The vehicle 24 may be a motor vehicle. For example, the vehicle 24 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 24 may be a motor vehicle, the present disclosure is not limited to internal combustion engines as a source of locomotive power for the vehicle 24. Rather, alternative sources may be utilized in providing locomotive power to the vehicle 24. For example, locomotive power may be provided to the vehicle 24 by electric motors, fuel cells, and/or petroleum-based fuel engines. According to various examples, the vehicle 24 may be driver-controlled, semi-autonomous, fully-autonomous, or any combination of user-controlled and automated. For example, the semi-autonomous example of the vehicle 24 may perform many, or all, commuting functions (e.g., accelerating, braking, turning, signaling, etc.) independent of user interaction while the user maintains override control of the vehicle 24.

Referring again to FIGS. 1-13, the seating assembly 20 includes a coupling member 32, a seat 36, a seatback 40, a swivel plate 44, and a base plate 48. The seat 36 is pivotably coupled to the coupling member 32. The seatback 40 is also pivotably coupled to the coupling member 32. Additionally, the swivel plate 44 is coupled to the coupling member 32. The swivel plate 44 can include one or more swivel anchors 52. Each of the one or more swivel anchors 52 can extend from an underside 56 of the swivel plate 44. The base plate 48 is positioned below the swivel plate 44. The swivel plate 44 is capable of rotational motion about a vertical axis 60 relative to the base plate 48. For example, a swivel assembly 64 can enable rotational movement of the coupling member 32, the seat 36, the seatback 40, and the swivel plate 44 about the vertical axis 60 relative to the base plate 48. While the seating assembly 20 of the present disclosure allows for different seating orientations, modern OEMs of passenger vehicles would currently warn against employing some alternative uses for the passenger compartment 28 while the vehicle 24 is in motion; however it is anticipated that technology and the regulatory framework may evolve in the future to where such an activity is safe and permissible. The base plate 48 can include one or more base anchors 68. The one or more base anchors 68 can receive the one or more swivel anchors 52. For example, each of the one or more base anchors 68 can receive one of the one or more swivel anchors 52 in at least one rotational position of the seating assembly 20, as will be discussed in further detail herein.

Referring further to FIGS. 1-13, each of the one or more base anchors 68 can extend from a top side 72 of the base plate 48. In various examples, the one or more swivel anchors 52 may move relative to the one or more base anchors 68 as the seating assembly 20 is rotated about the vertical axis 60. In such an example, the one or more base anchors 68 may remain stationary, or fixed, in position regardless of a rotational position of the seating assembly 20 about the vertical axis 60. The one or more swivel anchors 52 and the one or more base anchors are configured to correspond with one another in at least one rotational position of the swivel plate 44. A base-anchor-facing surface 76 of one or more of the one or more swivel anchors 52 can include serrations 80. Similarly, a swivel-anchor-facing surface 84 of one or more of the one or more base anchors 68 can include serrations 88.

Figure 2:
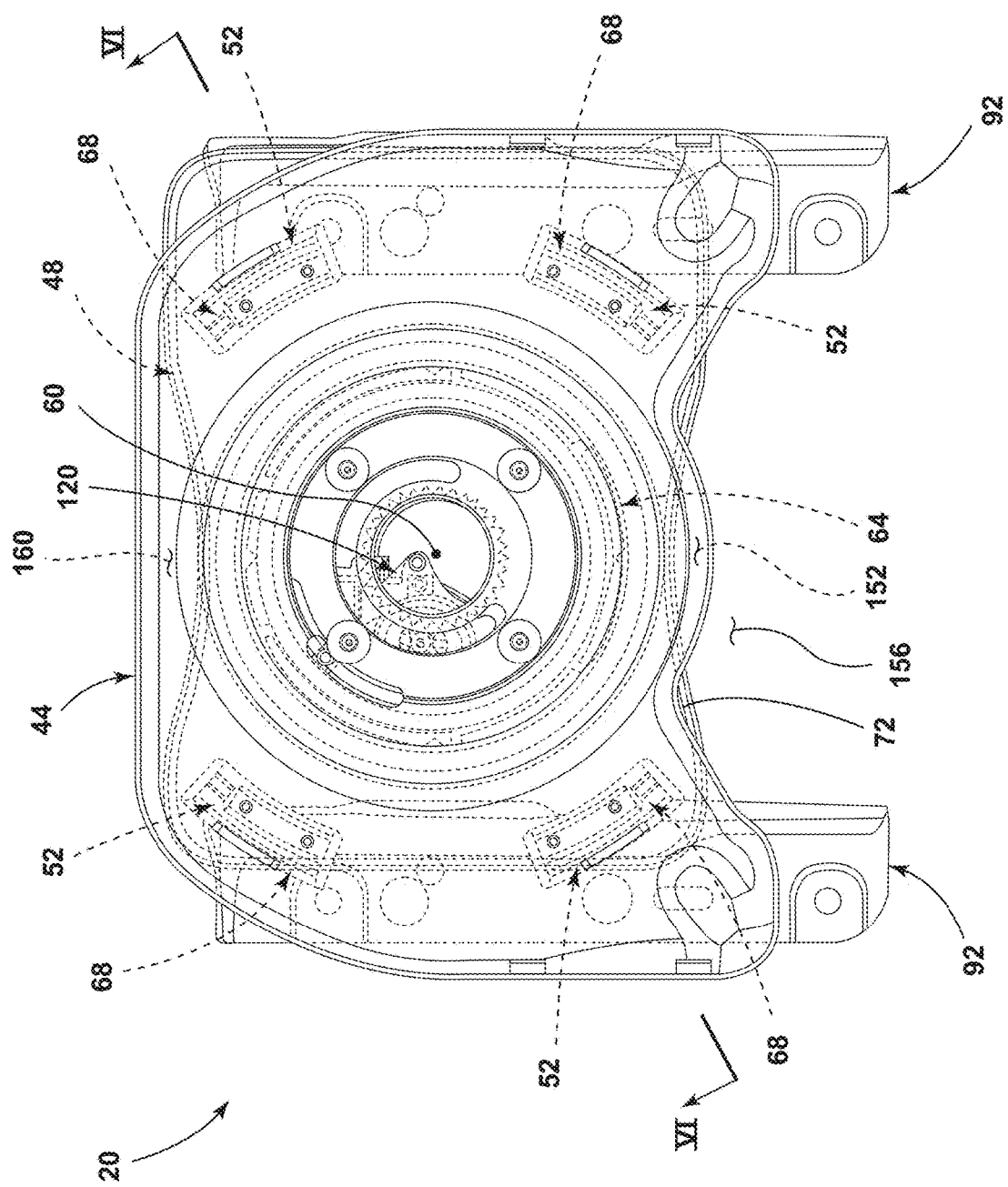
FIG. 2 is a top view of a portion of the seating assembly, illustrating various components thereof, according to one example.
Figure 3:
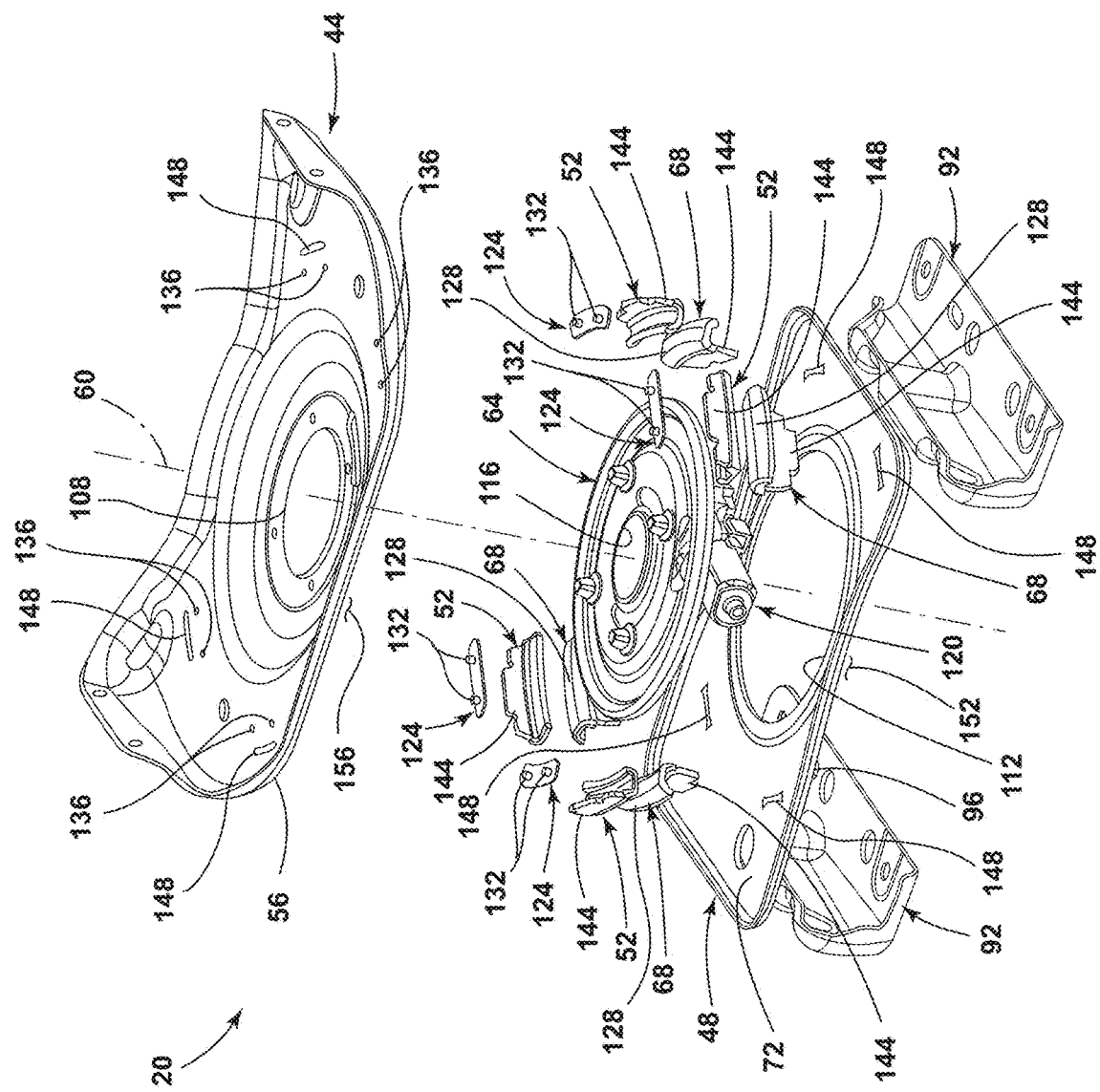
FIG. 3 is an exploded front perspective view of e portion of the seating assembly depicted in FIG. 2.

With specific reference to FIGS. 1-3, the seating assembly 20 can include legs 92 that are coupled to an underside 96 of the base plate 48. In some examples, the legs 92 may be directly coupled to a floor of the vehicle 24. In various examples, the legs 92 may be coupled to carriage assemblies that permit actuation of the seating assembly 20 along a longitudinal direction 100 and/or a lateral direction 104 of the passenger compartment 28. In such examples, the carriage assemblies may be received in rail assemblies of a network of rails that are positioned within the floor of the vehicle 24. The swivel plate 44 defines a swivel opening 108. The base plate 48 defines a base opening 112. The swivel assembly 64 defines a central opening 116. In a fully-assembled state, the swivel opening 108, the base opening 112, and the central opening 116 align with one another such that they define a pass-through pathway between the floor of the passenger compartment 28 and the seat 36. The pass-through pathway defined by the swivel opening 108, the base opening 112, and the central opening 116 can be used, for example, as a pathway for arranging power cables and/or data cables that enable functionalities of the seating assembly 20 and/or communication between the vehicle 24 (e.g., one or more computers on-board) and the seating assembly 20.

Referring again to FIGS. 1-3, the seating assembly 20 can include a rotation assembly 120. In various examples, at least a portion of the rotation assembly 120 can extend through the base opening 112 of the base plate 48. In such an example, at least a portion of the rotation assembly 120 can be positioned below the underside 96 of the base plate 48 when the seating assembly 20 is fully-assembled. The rotation assembly 120 is coupled to the swivel plate 44 and the base plate 48. For example, a first portion of the rotation assembly 120 may be directly coupled, or anchored, to the base plate 48. In such an example, a second portion of the rotation assembly 120 may be directly coupled, or anchored, to the swivel plate 44 in a manner that permits the rotation assembly 120 to induce rotation of the swivel plate 44, the seat 36, the coupling member 32, and the seatback 40 about the vertical axis 60. Additional details of the rotation assembly 120 will be discussed further herein. In some examples, the seating assembly 20 can include one or more engagement members 124 that are coupled to the underside 56 of the swivel plate 44. In such an example, the one or more engagement members 124 can be sized and positioned to engage with a swivel-plate-facing surface 128 of one or more of the one or more base anchors 68. Accordingly, the one or more engagement members 124 can decrease noise in operation of the swivel capabilities of the seating assembly 20 by enabling a tight fit between components.

Referring further to FIGS. 1-3, the one or more engagements members 124 can each include protrusions 132 extending therefrom that are configured to engage with corresponding receptacles 136 that are defined by the swivel plate 44. In various examples, the protrusions 132 may be threaded to receive a threaded fastener 140 (e.g., a nut) and secure the corresponding engagement member 124 to the swivel plate 44 (see FIG. 6). Alternative fastening approaches for securing the one or more engagement members 124 to the swivel plate 44 are contemplated and within the scope of the present disclosure. Each of the one or more swivel anchors 52 and the one or more base anchors 68 can be provided with a protuberance 144 that is sized and positioned for reception into corresponding slots 148 defined by the swivel plate 44 and the base plate 48, respectively. The engagement between the protuberances 144 and the slots 148 can be employed to facilitate securing the one or more swivel anchors 52 to the swivel plate 44 and securing the one or more base anchors 68 to the base plate 48. For example, the protuberances 144 may extend through the corresponding slots 148, at which point a weld may be applied to secure the protuberances 144 within the slots 148. In an alternative example, the protuberances 144 may be folded over or otherwise deformed to secure the protuberances 144 within the slots 148 (e.g., similar to fastening provided by a rivet).

Referring still further to FIGS. 1-3, the base plate 48 can be contoured to define a forward recess 152. Additionally, or alternatively, the swivel plate 44 may be contoured to define a front recess 156. The forward recess 152 and/or the front recess 156 provide increased foot room for a user of the seating assembly 20. The front recess 156 can provide increased foot room for the user independent of the rotational position of the seating assembly 20 about the vertical axis 60. In some examples, the base plate 48 can be contoured to define a rearward recess 160. The rearward recess 160 may be positioned on a diametrically opposing side of the base plate 48. The rearward recess 160 of the base plate 48 can provide increased foot room for the user of the seating assembly 20 when the seating assembly 20 is in a rearward-facing position.

Figure 4:
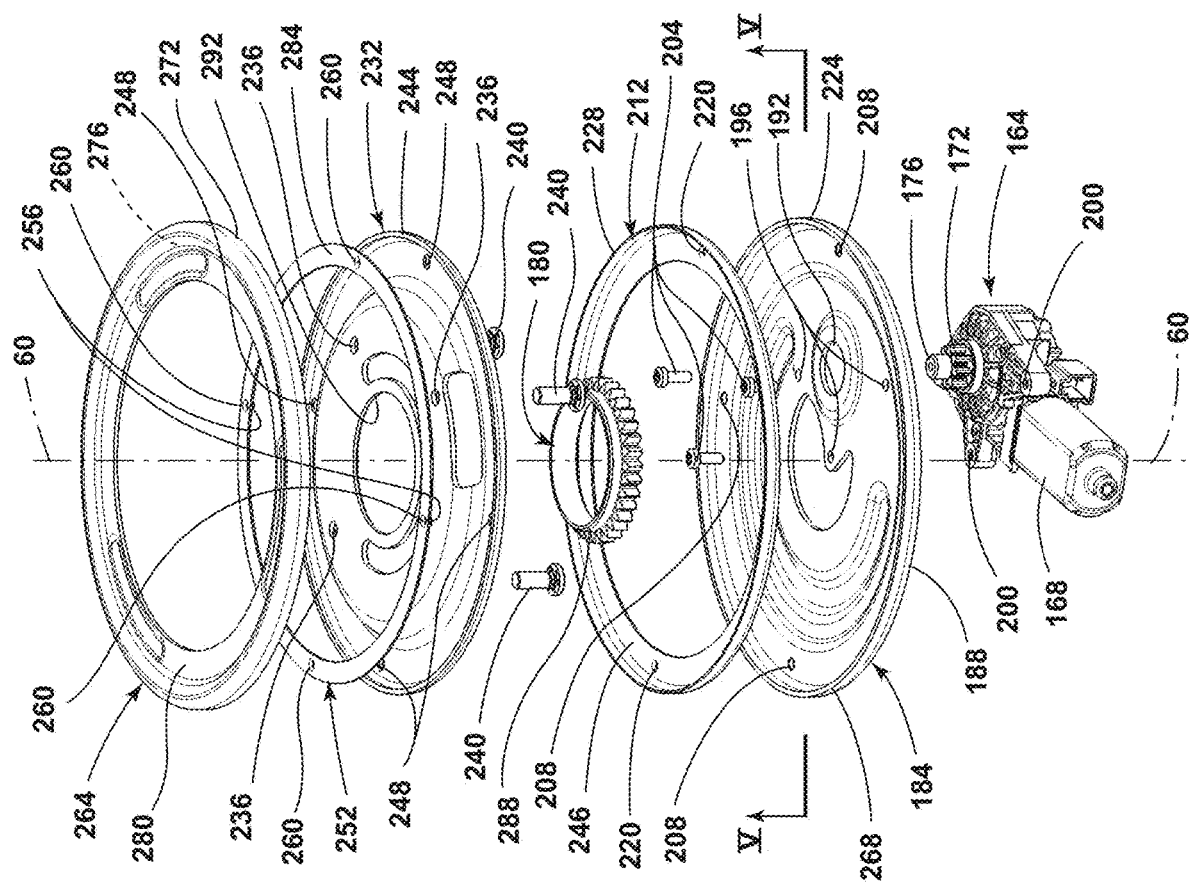
FIG. 4 is an exploded front perspective view of a swivel assembly of the seating assembly, according to one example.
Figure 5:
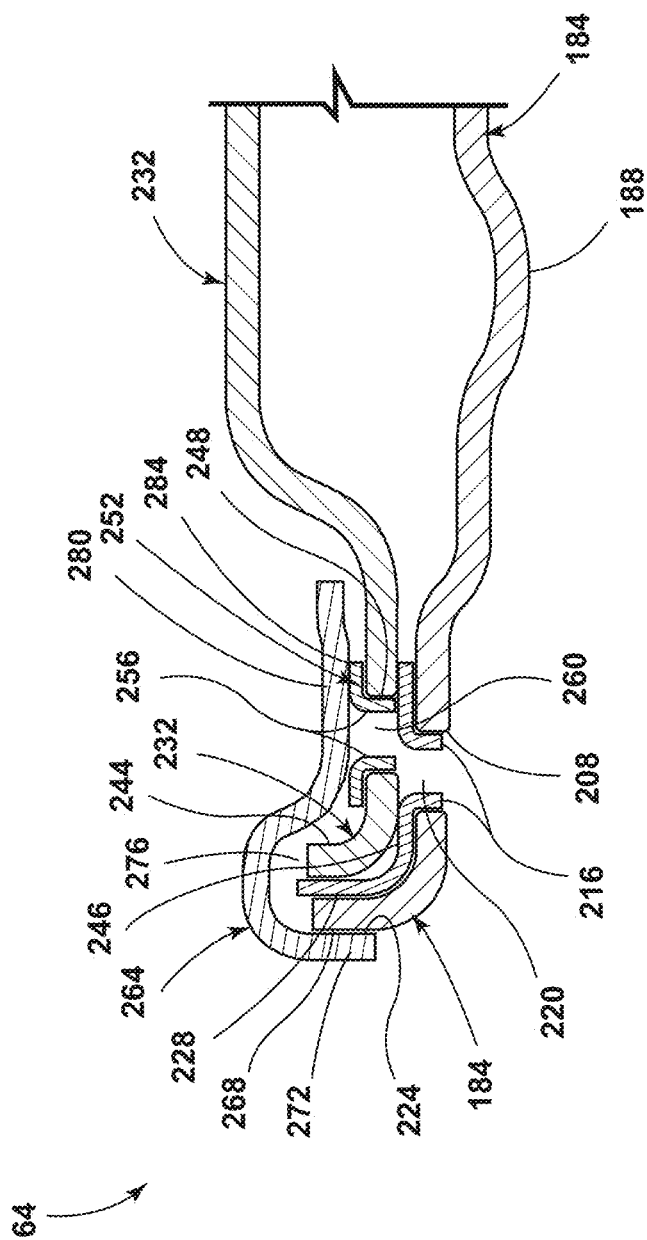
FIG. 5 is a cross-sectional view of the swivel assembly, taken along line V-V of FIG. 4, according to one example.
Figure 6:
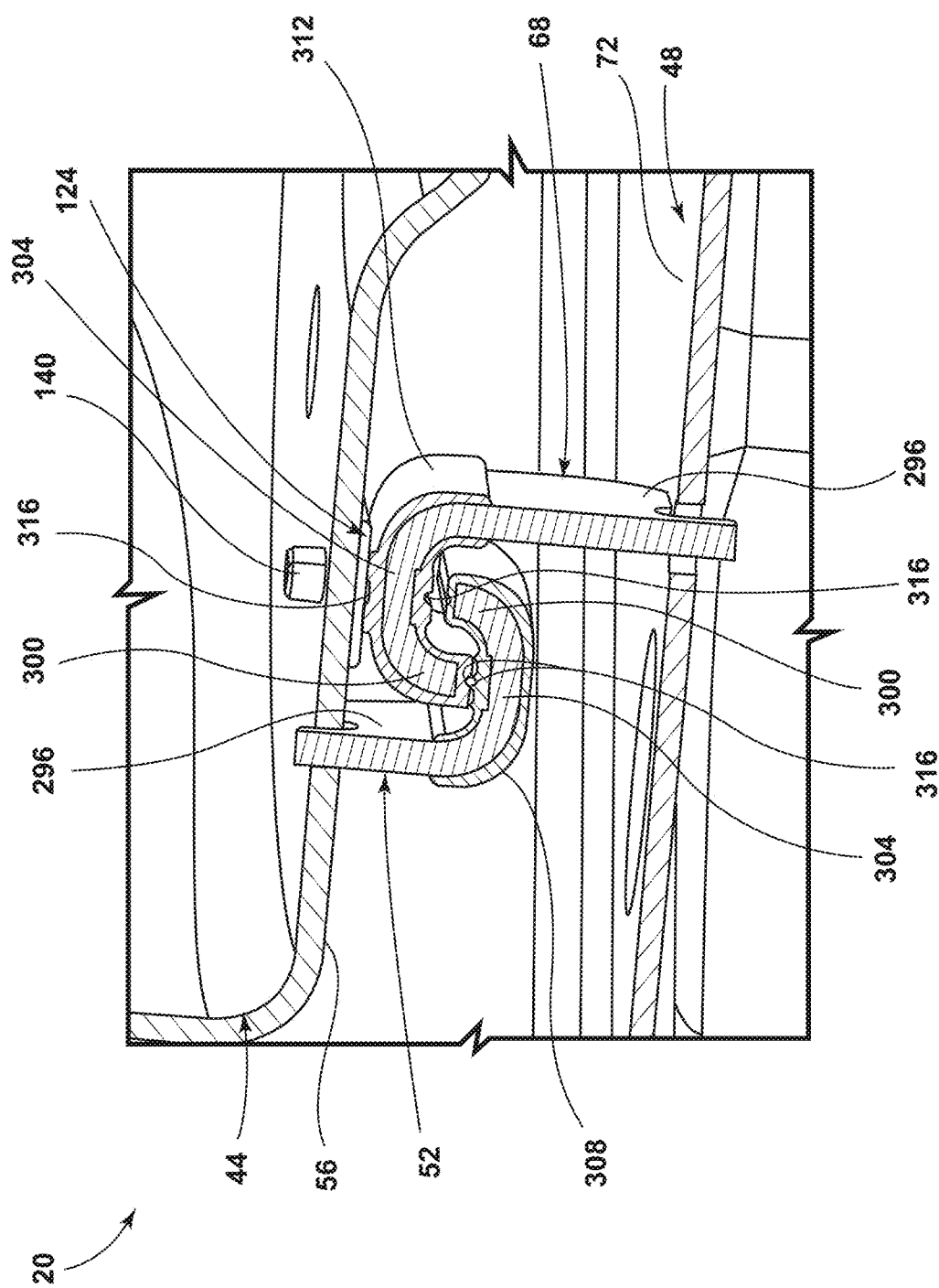
FIG. 6 is a cross-sectional view of a portion of the seating assembly, taken along line VI-VI of FIG. 2, illustrating an interaction between a base anchor and a swivel anchor when a material is coated onto the base anchor and the swivel anchor, according to one example.
Figure 7:
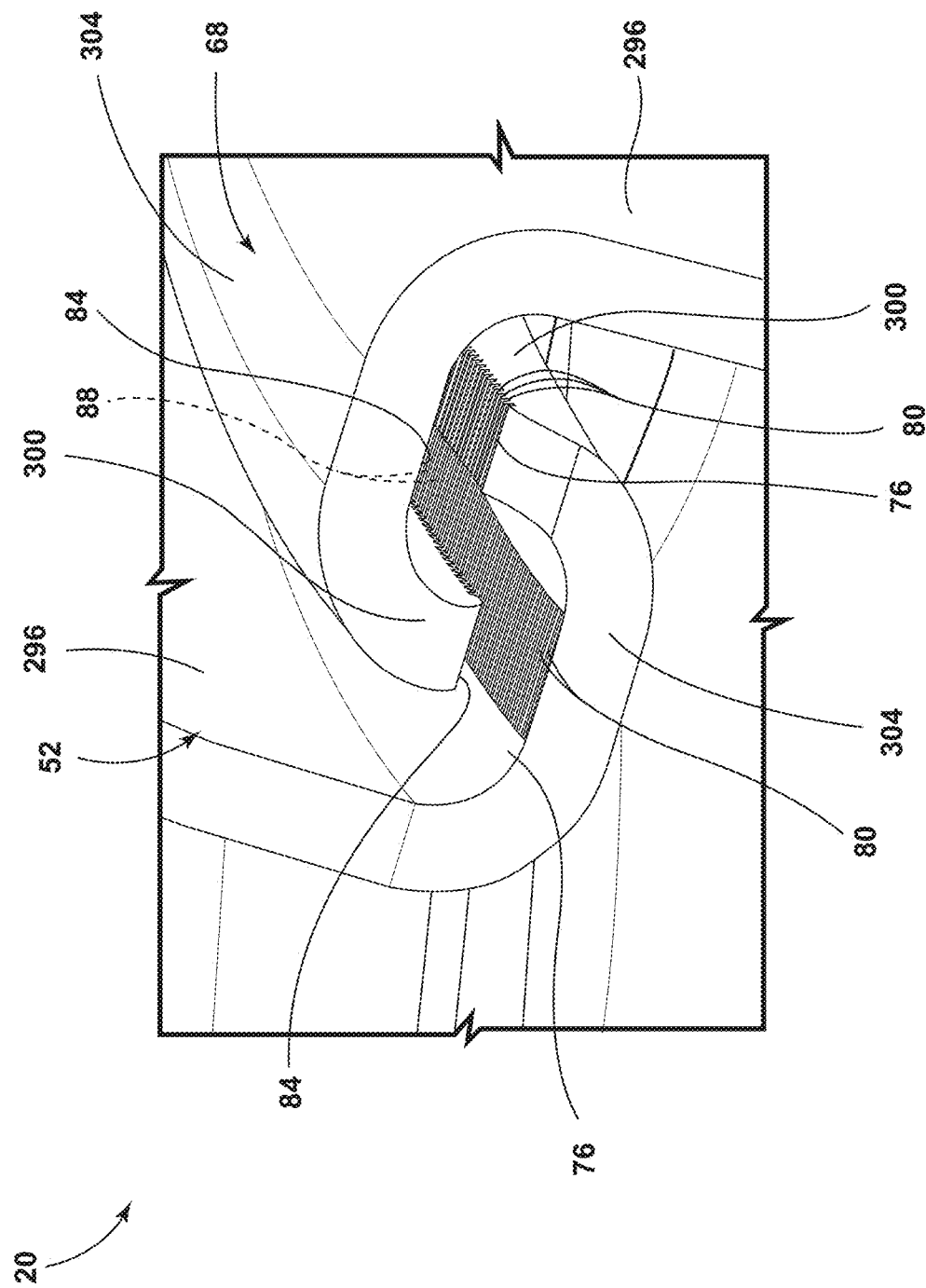
FIG. 7 is a side perspective view of the base anchor and the swivel anchor in the absence of the material that was coated thereon to show serrations that can be provided, according to one example.
Figure 8:
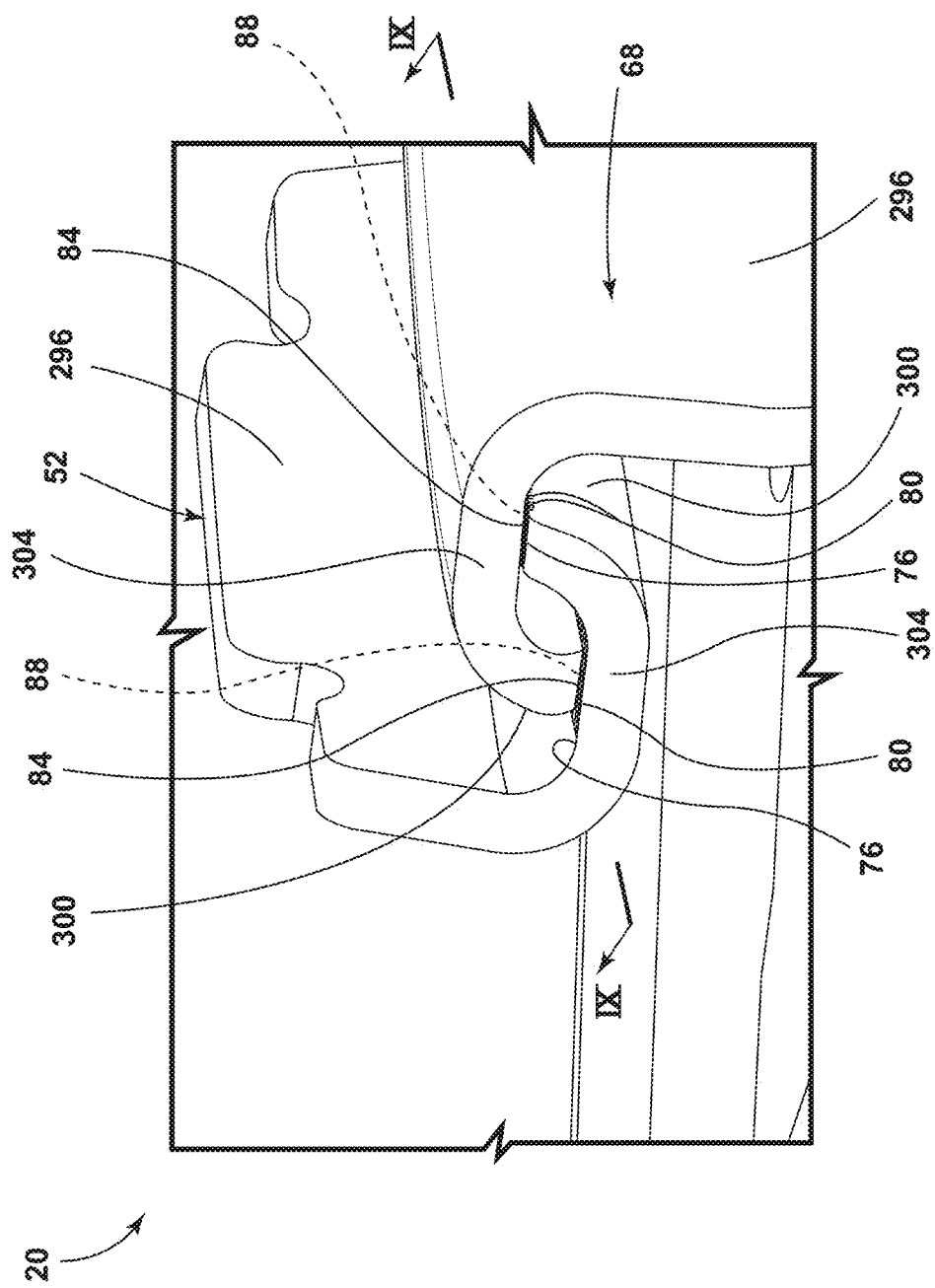
FIG. 8 is a side perspective view of the base anchor and the swivel anchor, illustrating engagement between the serrations provided thereon.
Figure 9:
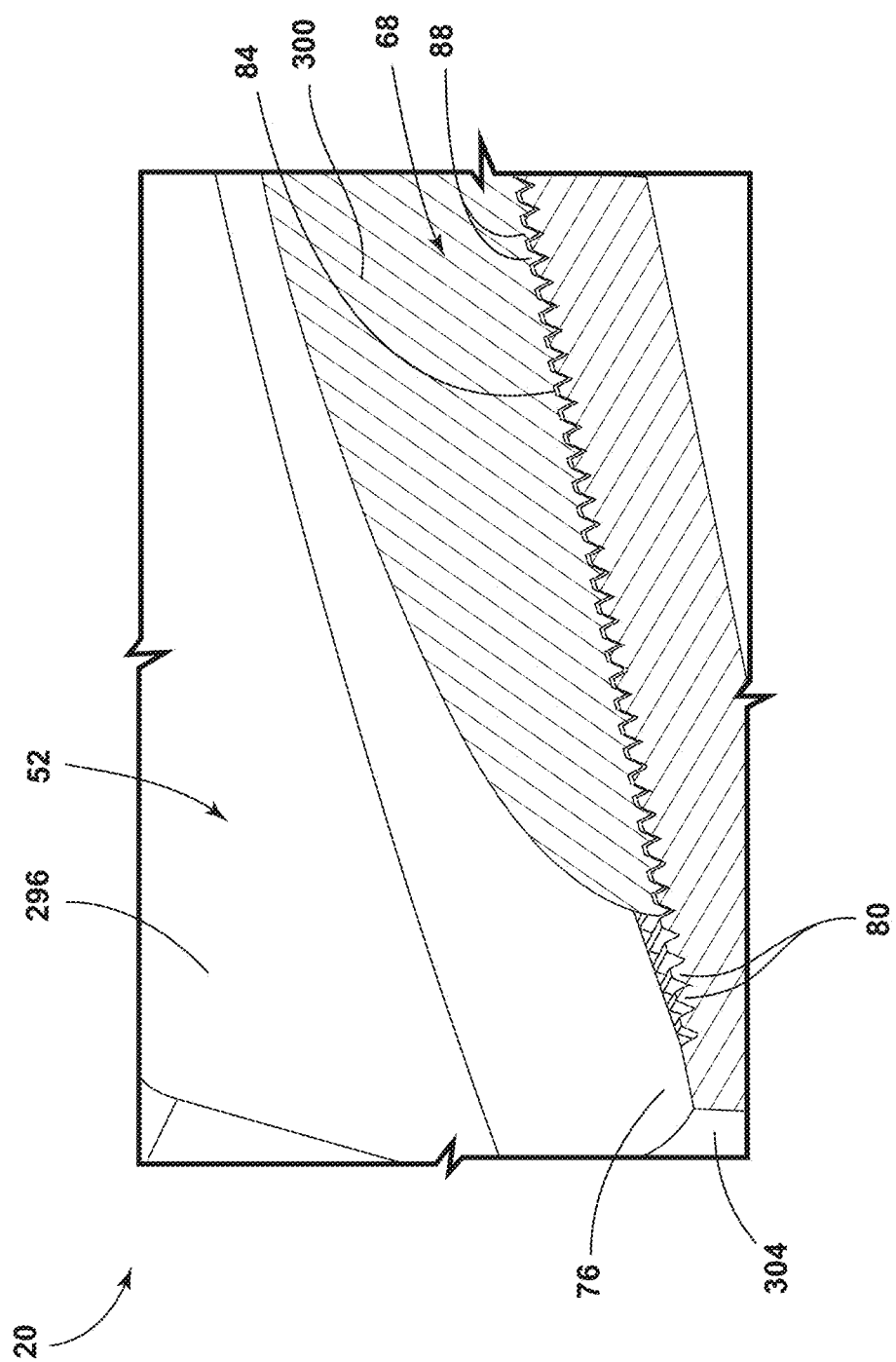
FIG. 9 is a cross-sectional view, taken along line IX-IX of FIG. 8, illustrating the engagement between the serrations, according to one example.
Figure 10:
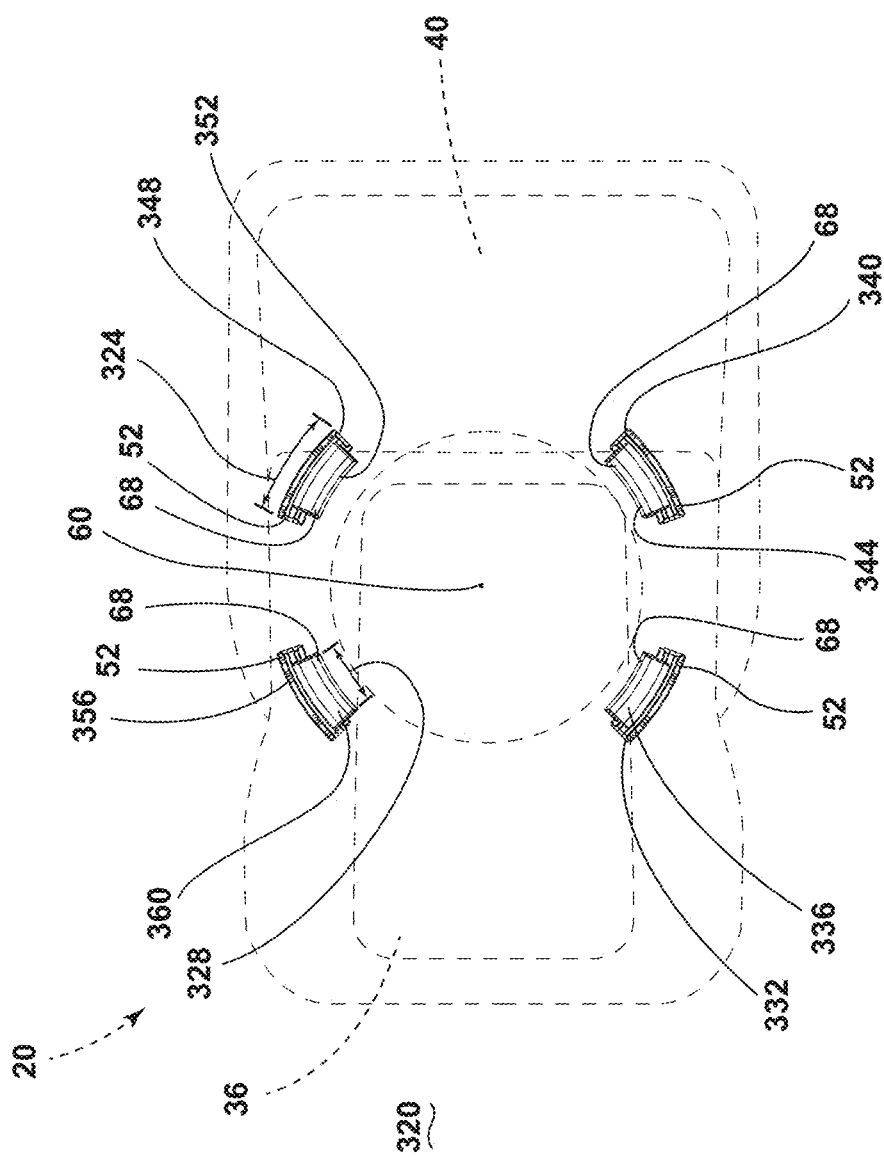
FIG. 10 is a top schematic view of the seating assembly, illustrating an interaction between a plurality of the swivel anchors and a plurality of base anchors when the seating assembly is in a forward-facing position, according to one example.
Figure 11:
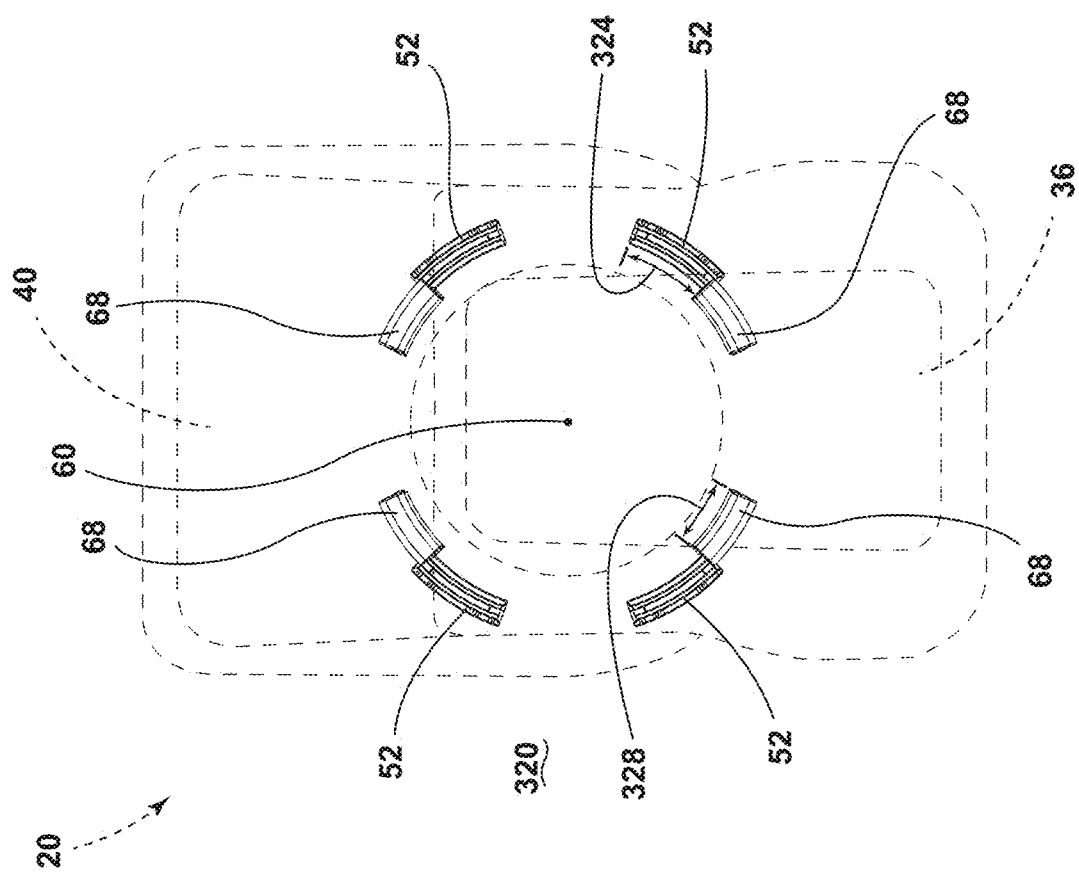
FIG. 11 is a top schematic view of the seating assembly, illustrating an interaction between the plurality of swivel anchors and the plurality of base anchors when the seating assembly is in a side-facing position, according to one example.
Figure 12:
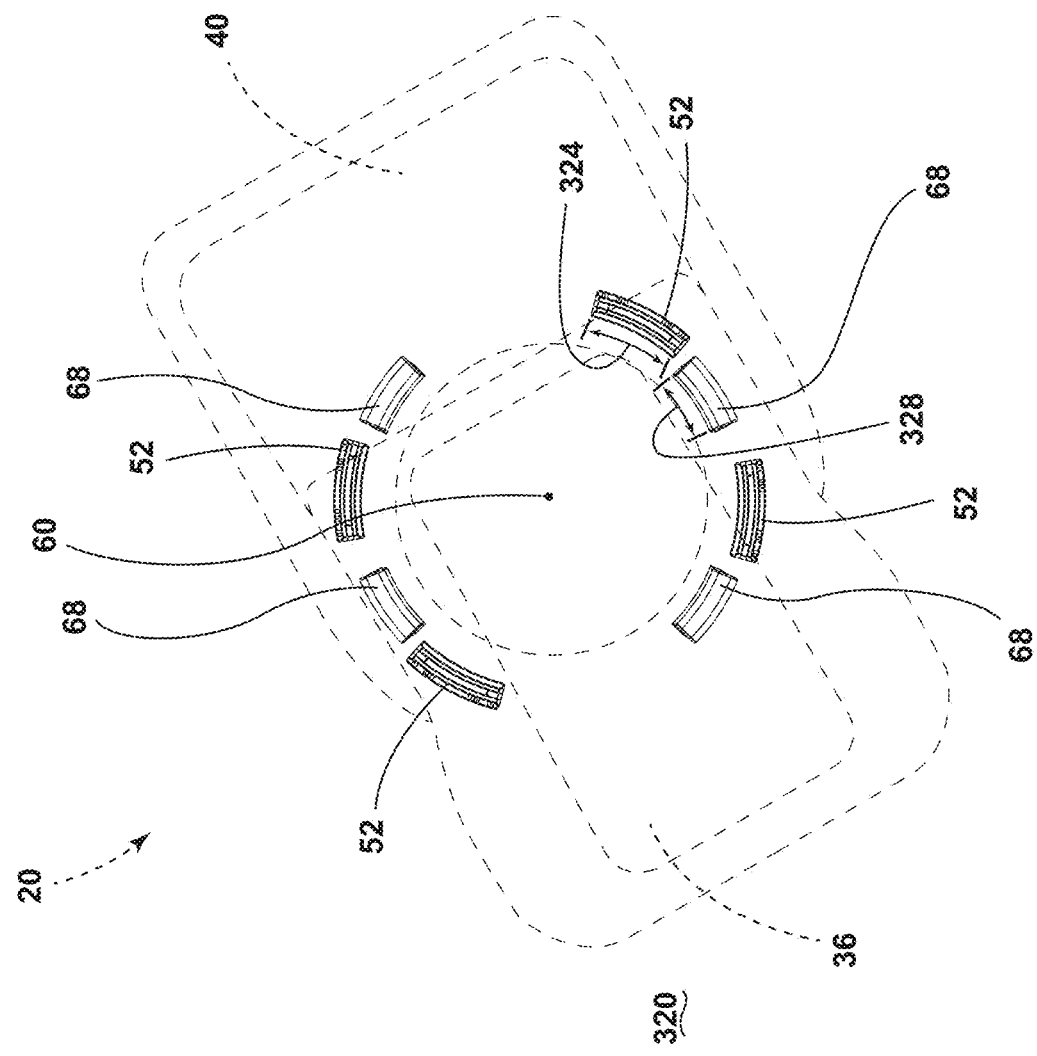
FIG. 12 is a top schematic view of the seating assembly, illustrating an interaction between the plurality of swivel anchors and the plurality of base anchors when the seating assembly is in a first diagonally-oriented position, according to one example.

Referring now to FIGS. 4 and 5, the rotation assembly 120 is coupled to the swivel assembly 64. The rotation assembly 120 includes a motor assembly 164. The motor assembly 164 includes a motor 168, a first gear 172, and a driveshaft 176. Activation of the motor 168 induces, or causes, rotation of the driveshaft 176. The first gear 172 is coupled to the driveshaft 176. Accordingly, the rotational motion induced in the driveshaft 176 by the motor 168 is transmitted to the first gear 172. A second gear 180 is coupled to the swivel plate 44 and engages, or meshes, with the first gear 172. Therefore, activation of the motor 168 ultimately causes movement of the second gear 180 and rotation of the swivel plate 44 about the vertical axis 60. In various examples, the motor 168 can be a non-back-drivable motor. Said another way, in various examples, the motor 168 is responsible for rotational movements about the vertical axis 60 and cannot be forced (e.g., by pushing on the seating assembly 20) to move. The swivel assembly 64 includes a fixed plate 184. The fixed plate 184 is directly coupled to the base plate 48. The motor assembly 164 coupled to an underside 188 of the fixed plate 184. The fixed plate 184 defines a first aperture 192 that receives the first gear 172 and the driveshaft 176 of the motor assembly 164 when the swivel assembly 64 is fully-assembled. The fixed plate 184 also defines mounting holes 196 that correspond with fastener holes 200 that are defined by the motor assembly 164. The mounting holes 196 and the fastener holes 200 each receive a fastener 204 to couple the motor assembly 164 to the fixed plate 184. The fixed plate 184 defines one or more first bearing apertures 208.

Referring again to FIGS. 4 and 5, the swivel assembly 64 includes a first bearing 212. The first bearing 212 defines protrusions 216 that extend downwardly to engage with each of the first bearing apertures 208. Accordingly, the number, sizing, and positioning of the first bearing apertures 208 and the protrusions 216 correspond with one another. In various examples, the protrusions 216 may extend downwardly from the first bearing 212 proximate to holes 220 defined by the first bearing 212. A perimeter of the fixed plate 184 can include a circumferential wall 224. The circumferential wall 224 of the fixed plate 184 extends upwardly toward the seat 36. The first bearing 212 can follow a contour of the fixed plate 184 such that the first bearing 212 includes an outer wall 228 that corresponds with the circumferential wall 224. In various examples, the outer wall 228 of the first bearing 212 can extend vertically above the circumferential wall 224. Said another way, an upper edge of the outer wall 228 of the first bearing 212 can be positioned at a greater height than an upper edge of the circumferential wall 224. The first bearing 212 may include a low-friction material. For example, the first bearing 212 can be made from materials that include, but are not limited to, polytetrafluoroethylene (PTFE) or PTFE-coated materials.

Referring further to FIGS. 4 and 5, the swivel assembly 64 can further include a rotating plate 232 that is directly coupled to the swivel plate 44. For example, the rotating plate 232 can define one or more fastener apertures 236 that each receives a swivel-plate-fastener 240. The rotating plate 232 includes a perimeter wall 244 that follows the contours of the circumferential wall 224 and the outer wall 228. Accordingly, the outer wall 228 of the first bearing 212 can be sandwiched between the circumferential wall 224 of the fixed plate 184 and the perimeter wall 244 of the rotating plate 232. By so positioning the first bearing 212, movement of the rotating plate 232 relative to the fixed plate 184 can be accomplished with decreased friction and/or a decrease in noise that can result from such movement. The rotating plate 232 engages with an upper surface 246 of the first bearing 212. Similar to the fixed plate 184, the rotating plate 232 defines one or more second bearing apertures 248. The swivel assembly 64 includes a second bearing 252 that engages with the one or more second bearing apertures 248 defined by the rotating plate 232. The second bearing 252 defines one or more protuberances 256 that extend downwardly therefrom to engage with a corresponding one of the one or more second bearing apertures 248.

Referring still further to FIGS. 4 and 5, as with the fixed plate 184 and the first bearing 212, the number, sizing, and positioning of the second bearing apertures 248 and the protuberance(s) 256 correspond with one another. In various examples, the protuberances) 256 may extend downwardly from the second bearing 252 proximate to holes 260 defined by the second bearing 252. In various examples, the outer wall 228 of the first bearing 212 can extend vertically above the perimeter wall 244 of the rotating plate 232. Said another way, an upper edge of the outer wall 228 of the first bearing 212 can be positioned at a greater height than an upper edge of the perimeter wall 244 of the rotating plate 232. The second bearing 252 may include a low-friction material. For example, the second bearing 252 can be made from materials that include, but are not limited to, polytetrafluoroethylene (PTFE) or PTFE-coated materials. The swivel assembly 64 can also include a retaining bracket 264. The retaining bracket 264 can be coupled to a circumferential surface 268 of the fixed plate 184. For example, the retaining bracket 264 can be welded to the circumferential surface 268.

Referring yet again to FIGS. 4 and 5, the retaining bracket 264 can include a downward-turned lip 272 that is coupled to the circumferential surface 268. Moving radially inward from the downward-turned lip 272, the retaining bracket 264 can define a channel 276 that receives at least a portion of the circumferential wall 224, the outer wall 228, and the perimeter wall 244. Radially inward from the channel 276, the retaining bracket 264 can be provided with a flange 280 that engages with a top surface 284 of the second bearing 252. In some examples, the second gear 180 can be provided with an upper flange 288 that is sized to be received within a central aperture 292 that is defined by the rotating plate 232. The upper flange 288 can be fixedly coupled to the rotating plate 232 by way of the central aperture 292 (e.g., by welding) such that rotational motion imparted to the second gear 180 by the motor 168 induces rotational motion of the rotating plate 232 and ultimately the swivel plate 44.

Referring now to FIGS. 6-9, the swivel anchor(s) 52 and the base anchor(s) 68 can each have a first leg 296 and a second leg 300 with an arcuate region 304 extending between the first leg 296 and the second leg 300. In some examples, the first leg 296 may have a length that is greater than a length of the second leg 300. In various examples, the swivel anchor(s) 52 and/or the base anchor(s) 68 can be J-shaped. In examples where the swivel anchor(s) 52 and the base anchor(s) 68 are both J-shaped, the swivel anchor(s) 52 and the base anchor(s) 68 can be inverted mirror images of one another such that the second leg 300 of the swivel anchor 52 is positioned to correspond with the arcuate region 304 of the base anchor 68 and the second leg 300 of the base anchor 68 is positioned to correspond with the arcuate region 304 of the swivel anchor 52. In various examples, the serrations 80 on the swivel anchor(s) 52 can be coated with a first material 308 and/or the serrations 88 on the base anchor(s) 68 can be coated with a second material 312. In some examples, the first material 308 and the second material 312 may be the same. Alternatively, the first material 308 may differ from the second material 312. The first material 308 and/or the second material 312 can be coated onto at least a portion of the first leg 296, the second leg 300, and/or the arcuate region 304 of the swivel anchor(s) 52 and the base anchor(s) 68, respectively.

Referring again to FIGS. 6-9, the first material 308 and the second material 312 that are coated onto the serrations 80 and the serrations 88, respectively, can provide a flat, or flatter, surface to the corresponding anchor. For example, the first material 308 can fill the serrations 80 on the swivel anchor(s) 52 such that a flat, or flatter, surface is provided to the base-anchor-facing surface 76. Similarly, the second material 312 can fill the serrations 88 on the base anchor(s) 68 such that a flat, or flatter surface is provided to the swivel-anchor-facing surface 84. In various examples, the serrations 80 can be provided at the arcuate region 304 of the swivel anchor(s) 52, as well as at a terminal edge or surface of the second leg 300 of the swivel anchor(s) 52. Similarly, the serrations 88 can be provided at the arcuate region 304 of the base anchor(s) 68, as well as at a terminal edge or surface of the second leg 300 of the base anchor(s) 68. The first material 308 and the second material 312 can decrease friction and/or decrease noise when the seating assembly 20 is rotated about the vertical axis 60. The first material 308 and/or the second material 312 can be overmolded onto the swivel anchor(s) 52 and the base anchor(s) 68, respectively. In various examples, the first material 308 and the second material 312 can be low-friction materials. In one specific, non-limiting, example, the first material 308 and the second material 312 can be an acetal homopolymers.

Referring further to FIGS. 6-9, a thickness of the first material 308 and/or a thickness of the second material 312 can be varied depending on location on the swivel anchor(s) 52 and the base anchor(s) 68, respectively. For example, the thickness of the first material 308 and/or the thickness of the second material 312 can be decreased at predetermined location(s). By decreasing the thickness of the first material 308 and/or the second material 312 at the predetermined location(s), stress concentrators 316 can be introduced that can encourage a break-up, dislodging, and/or disintegration of the first material 308 and/or the second material 312 under predetermined conditions. The predetermined conditions that can lead to a break-up, dislodging, and/or disintegration of the first material 308 and/or the second material 312 can include application of a vertical force (e.g., in an upward direction) to the seat 36 and/or the swivel plate 44. Application of the vertical force can result in a compressive force being applied to the first material 308 and the second material 312. In such a situation, the serrations 80 and the serrations 88 can aid in the break-up, dislodging, and/or disintegration of the first material 308 and the second material 312. Once a sufficient amount of the first material 308 and the second material 312 has been removed from between the serrations 80 and the serrations 88, the serrations 80 and the serrations 88 can engage with one another and prevent rotation of the swivel plate 44 relative to the base plate 48 about the vertical axis 60 (e.g., see FIGS. 8 and 9).

Figure 13:
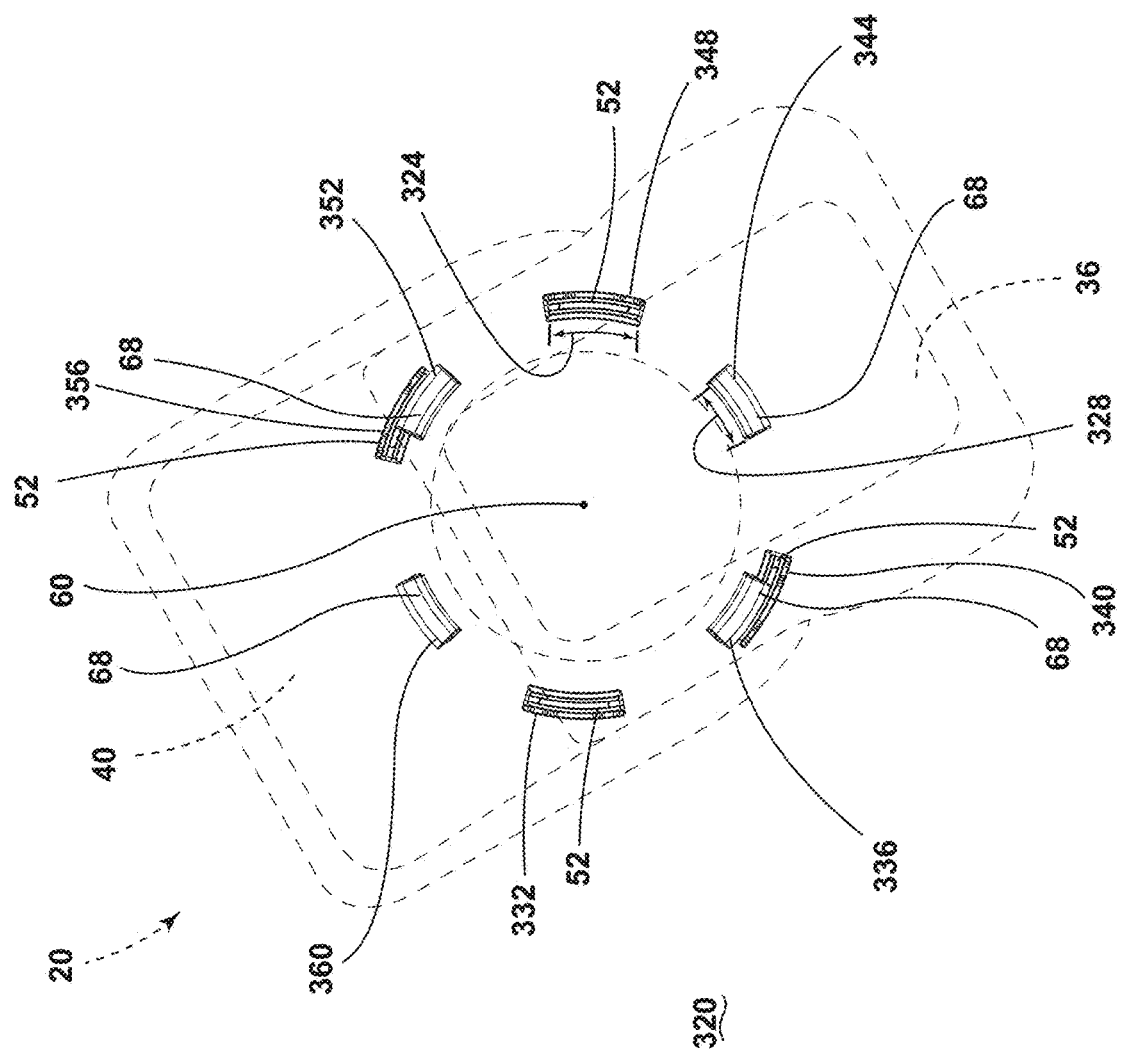
FIG. 13 is a top schematic view of the seating assembly, illustrating an interaction between the plurality of swivel anchors and the plurality of base anchors when the seating assembly is in a second diagonally-oriented position, according to one example.

Referring to FIGS. 10-13, in the depicted example, a plurality of the swivel anchors 52 and a plurality of the base anchors 68 are provided on the seating assembly 20. Each of the swivel anchors 52 is received in one of the base anchors 68 when the seating assembly 20 is in a forward-facing position (FIG. 13). Similarly, each of the plurality of swivel anchors 52 may be received within one of the plurality of base anchors 68 when the seating assembly 20 is in a rearward-facing position. In the position of the seating assembly 20 depicted in FIG. 13, the seat 36 and the seatback 40 are oriented toward a front 320 of the vehicle 24 to which the seating assembly 20 is coupled. In the forward-facing position and/or the rearward-facing position, a surface area of overlap between the plurality of swivel anchors 52 and the plurality of base anchors 68 may be maximized in some examples, a length 324 of the swivel anchor 52 may be greater than a length 328 of the base anchor 68. Alternatively, the length 324 of the swivel anchor 52 and the length 328 of the base anchor 68 may be the same or substantially the same. The length 324 of the swivel anchor 52 and the length 328 of the base anchor 68 may be referred to as arc lengths. As used herein, the term arc length is intended to refer to a section of a circumference of a circle that corresponds to a given length along that circumference of that circle. Accordingly, the swivel anchors 52 and the base anchors 68 may be curved or arcuate. The swivel anchors 52 and the base anchors 68 are configured in a mating relationship, as discussed above.

Referring again to FIGS. 10-13, the surface area of overlap between the plurality of swivel anchors 52 and the plurality of base anchors 68 may be greater in the forward-facing position than a side-facing position (FIG. 11). Additionally, or alternatively, the surface area of overlap between the plurality of swivel anchors 52 and the plurality of base anchors 68 may be greater in the rearward-facing position than the side-facing position. The surface area of overlap between the swivel anchors 52 and the base anchors 68 when the seating assembly 20 is in the side-facing position may be very small; however, a surface area of overlap between each of the swivel anchors 52 and the base anchors 68 may remain. In some examples, the plurality of swivel anchors 52 may be free of engagement with the plurality of base anchors 68 when the seating assembly 20 is in the side-facing position. The side-facing position of the seating assembly 20 may be rotationally displaced from the forward-facing position and/or the rearward-facing position by about ninety degrees (90°).

Referring further to FIGS. 10-13, rotational positions of the seating assembly 20 that are between the forward-facing position and the side-facing position, or between the rearward-facing position and the side-facing position, may be referred to as diagonally-oriented positions. In some diagonally-oriented positions, such as that depicted in FIG. 12, the plurality of swivel anchors 52 and the plurality of base anchors 68 may be entirely disengaged from one another. Said another way, the surface area of overlap between the swivel anchors 52 and the base anchors 68, when in some diagonally-oriented positions, may be zero or non-existent. In the diagonally-oriented position depicted in FIG. 12, the seating assembly 20 is displaced from the forward-facing position by rotation of the seating assembly 20 about the vertical axis 60 by approximately thirty degrees (30°) in a counterclockwise direction.

Referring still further to FIGS. 10-13, in various ones of the diagonally-oriented positions, such as that depicted in FIG. 13, a first diagonal pair of the plurality of swivel anchors 52 may be engaged with a first diagonal pair of the plurality of base anchors 68. To aid in discussion, the plurality of swivel anchors 52 and the plurality of base anchors 68 will be given numerical assignments that are associated with the coupling depicted in the forward-facing position of FIG. 10. More specifically, in the forward-facing position, a first swivel anchor 332 may be associated with a first base anchor 336. Additionally, a second swivel anchor 340 may be associated with a second base anchor 344. Further, a third swivel anchor 348 may be associated with a third base anchor 352. Still further, a fourth swivel anchor 356 may be associated with a fourth base anchor 360. With the numerical frame of reference having been established with regard to the plurality of swivel anchors 52 and the plurality of base anchors 68, further discussion of the diagonally-oriented positions may now be undertaken.

Referring yet again to FIGS. 10-13, the first diagonal pair of the plurality of swivel anchors 52 may be the second swivel anchor 340 and the fourth swivel anchor 356, while the first diagonal pair of the plurality of base anchors 68 may be the first base anchor 336 and the third base anchor 352. More specifically, in the diagonally-oriented position depicted in FIG. 13, the second swivel anchor 340 may be associated with the first base anchor 336 and the fourth swivel anchor 356 may be associated with the third base anchor 352. In the diagonally-oriented position depicted in FIG. 13, the first swivel anchor 332 and the third swivel anchor 348 are not engaged with any of the plurality of base anchors 68. Similarly, in the diagonally-oriented position depicted in FIG. 13, the second base anchor 344 and the fourth base anchor 360 are free of engagement from any of the plurality of swivel anchors 52. Accordingly, when the seating assembly 20 is in the diagonally-oriented position depicted in FIG. 13, a second diagonal pair of the plurality of swivel anchors 52 (i.e., the first swivel anchor 332 and the third swivel anchor 348) are disengaged with a second diagonal pair of the plurality of base anchors 68 (i.e., the second base anchor 344 and the fourth base anchor 360). As is readily apparent, further rotation of the seating assembly 20 in a clockwise direction from the position depicted in FIG. 13 will result in an alternative pairing of engagement between diagonally oriented ones of the swivel anchors 52 and the diagonally oriented ones of the base anchors 68. For example, further rotation of the seating assembly 20 in the clockwise direction from the position depicted in FIG. 13 will, at some point, result in the first swivel anchor 332 engaging with the fourth base anchor 360 and the third swivel anchor 348 engaging with the second base anchor 344. In such a position, the first base anchor 336 and third base anchor 352 are free of engagement with any of the swivel anchors 52. Additionally, in such a position, the second swivel anchor 340 and the fourth swivel anchor 356 are free of engagement with any of the base anchors 68.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

The invention claimed is:

1. A seating assembly, comprising:
a coupling member;
a seat pivotably coupled to the coupling member;
a seatback pivotably coupled to the coupling member;
a swivel plate coupled to the coupling member;
a swivel anchor that extends from an underside of the swivel plate;
a base plate positioned below the swivel plate, wherein the swivel plate is capable of rotating about a vertical axis relative to the base plate; and
a base anchor that extends from a top side of the base plate, wherein the swivel anchor and the base anchor are configured to correspond with one another in at least one rotational position of the swivel plate, wherein a base-anchor-facing surface of the swivel anchor is provided with serrations, wherein a swivel-anchor-facing surface of the base anchor is provided with serrations, wherein the serrations on the swivel anchor and the serrations on the base anchor are each coated with a material.

2. The seating assembly of claim 1, wherein the material that is coated onto the serrations of the swivel anchor differs from the material coated onto the serrations of the base anchor.

3. The seating assembly of claim 1, wherein the material coated onto the serrations on the swivel anchor provides a flat surface to the base-anchor-facing surface, and wherein the material coated onto the serrations on the base anchor provides a flat surface to the swivel-anchor-facing surface.

4. The seating assembly of claim 1, wherein the material that is coated onto the serrations on the swivel anchor and the serrations on the base anchor is a low-friction material.

5. The seating assembly of claim 1, further comprising:
an engagement member that is coupled to the underside of the swivel plate, wherein the engagement member is sized and positioned to engage with a swivel-plate-facing surface of the base anchor.

6. The seating assembly of claim 1, further comprising:
a rotation assembly that is coupled to the swivel plate and the base plate.

7. The seating assembly of claim 1, wherein the base plate is contoured to define a forward recess.

8. The seating assembly of claim 7, wherein the swivel plate is contoured to define a front recess.

9. The seating assembly of claim 1, wherein the swivel anchor is J-shaped, and wherein the base anchor is J-shaped.

10. The seating assembly of claim 1, wherein the rotation of the swivel plate about the vertical axis relative to the base plate is enabled by a swivel assembly, and wherein the swivel assembly is positioned between the swivel plate and the base plate.

11. The seating assembly of claim 10, wherein the swivel assembly comprises:
a fixed plate that is directly coupled to the base plate, wherein the fixed plate defines a first bearing aperture;
a first bearing defining a protrusion that extends downwardly to engage with the first bearing aperture;
a rotating plate that is directly coupled to the swivel plate, wherein the rotating plate rotates relative to the fixed plate, wherein the rotating plate engages with an upper surface of the first bearing, and wherein the rotating plate defines a second bearing aperture;
a second bearing defining a protuberance that extends downwardly to engage with the second bearing aperture; and
a retaining bracket that is coupled to a circumferential surface of the fixed plate, wherein the retaining bracket engages with a top surface of the second bearing.

12. A seating assembly, comprising:
a coupling member,
a seat pivotably coupled to the coupling member;
seatback pivotally coupled to the coupling member;
a swivel plate coupled to the coupling member;
a swivel anchor that extends from an underside of the swivel plate;
a base plate positioned below the swivel plate, wherein the swivel plate is capable of rotating about a vertical axis relative to the base plate;
a base anchor that extends from a top side of the base plate, wherein the swivel anchor and the base anchor are configured to correspond with one another in at least one rotational position of the swivel plate wherein a base-anchor-facing surface of the swivel anchor is provided with serrations, and wherein a swivel-anchor-facing surface of the base anchor is provided with serrations;
a rotation assembly that is coupled to the swivel plate and the base;
a motor assembly that comprises a motor, a first gear, and a drive shaft that is coupled to the motor and the first gear; and
a second gear that is coupled to the swivel plate and engages with the first gear, wherein activation of the motor causes movement of the second gear and rotation of the swivel plate about the vertical axis.

13. A seating assembly, comprising:
a coupling member;
a seat pivotably coupled to the coupling member;
a seatback pivotably coupled to the coupling member;
a swivel plate coupled to the coupling member;
a base plate positioned below the swivel plate, wherein the swivel plate is capable of rotating about a vertical axis relative to the base plate; and
a swivel assembly, wherein the rotation of the swivel plate about the vertical axis relative to the base plate is enable by the swivel assembly, wherein the swivel assembly is positioned between the swivel plate and the base plate, and wherein the swivel assembly comprises:
a fixed plate that is directly coupled to the base plate, wherein the fixed plate defines a first bearing aperture;
a first bearing defining a protrusion that extends downwardly to engage with the first bearing aperture;

a rotating plate that is directly coupled to the swivel plate, wherein the rotating plate rotates relative to the fixed plate, wherein the rotating plate engages with an upper surface of the first bearing, and wherein the rotating plate defines a second bearing aperture;

a second bearing defining a protuberance that extends downwardly to engage with the second bearing aperture; and a retaining bracket that is coupled to a circumferential surface of the fixed plate, wherein the retaining bracket engages with a top surface of the second bearing.

14. The seating assembly of claim 13, further comprising:
a swivel anchor that extends from an underside of the swivel plate; and
a base anchor that extends from a top side of the base plate, wherein the swivel anchor and the base anchor are configured to correspond with one another in at least one rotational position of the swivel plate.

15. The seating assembly of claim 14, wherein a base-anchor-facing surface of the swivel anchor is provided with serrations, and wherein a swivel-anchor-facing surface of the base anchor is provided with serrations.

16. The seating assembly of claim 14, wherein the serrations on the swivel anchor and the serrations on the base anchor are each coated with a material, wherein the material coated onto the serrations on the swivel anchor provides a flat surface to the base-anchor-facing surface, and wherein the material coated onto the serrations on the base anchor provides a flat surface to the swivel-anchor-facing surface.

17. The seating assembly of claim 14, further comprising:
an engagement member that is coupled to the underside of the swivel plate, wherein the engagement member is sized and positioned to engage with a swivel-plate-facing surface of the base anchor.

18. The seating assembly of claim 13, further comprising:
a rotation assembly that is coupled to the swivel plate and the base plate, wherein the rotation assembly comprises:
a motor assembly that comprises a motor, a first gear, and a drive shaft that is coupled to the motor and the first gear; and
a second gear that is coupled to the swivel plate and engages with the first gear, wherein activation of the motor causes movement of the second gear and rotation of the swivel plate about the vertical axis.

19. The seating assembly of claim 13, wherein the base plate is contoured to define a forward recess, and wherein the swivel plate is contoured to define a front recess.

* * * * *

UNITED STATES PATENT AND TRADEMARK OFFICE
CERTIFICATE OF CORRECTION

PATENT NO. : 11,904,737 B2
APPLICATION NO. : 17/865591
DATED : February 20, 2024
INVENTOR(S) : Aktas et al.

It is certified that error appears in the above-identified patent and that said Letters Patent is hereby corrected as shown below:

In the Claims

Column 13:
Claim 1, Line 39;
After "serrations" insert --and--.

Column 14:
Claim 12, Line 25;
"," should be --;--.

Column 14:
Claim 12, Line 27;
Before "seatback" insert --a--.

Column 14:
Claim 12, Line 37;
After "plate" insert --,--.

Column 14:
Claim 12, Line 44;
After "base" insert --plate--.

Signed and Sealed this
Sixteenth Day of April, 2024

Katherine Kelly Vidal
Director of the United States Patent and Trademark Office